United States Patent [19]

Motomura et al.

[11] Patent Number: 4,521,102
[45] Date of Patent: Jun. 4, 1985

[54] COPY PAPER COUNTING METHOD AND DEVICE FOR COPYING APPARATUS

[75] Inventors: Minoru Motomura, Nara; Kiyoshi Shibata, Osaka; Toshio Watanabe, Osaka; Yousuke Ohata, Osaka, all of Japan

[73] Assignee: Mita Industrial Co., Ltd., Osaka, Japan

[21] Appl. No.: 181,842

[22] Filed: Aug. 27, 1980

[30] Foreign Application Priority Data

Sep. 3, 1979 [JP] Japan .............................. 54-113213

[51] Int. Cl.³ ........................................... G03G 15/00
[52] U.S. Cl. ............................. 355/14 CU; 355/3 R; 355/14 R; 355/3 SH; 355/14 SH; 377/8
[58] Field of Search ............... 355/3 R, 14 R, 14 CU, 355/14 SH, 3 SH; 235/92 SB, 92 SH, 92 R

[56] References Cited

U.S. PATENT DOCUMENTS 3,813,157  5/1974  Fantozzi .
4,128,756  12/1978  Nagano et al. ............. 355/14 CU X
4,163,897  8/1979  Hubbard et al. ........... 355/14 CU X Primary Examiner—A. C. Prescott
Attorney, Agent, or Firm—Wenderoth, Lind & Ponack

[57] ABSTRACT

A copy paper counting method for a copying apparatus including the steps of: counting the copy paper by means of a first counter; terminating the feed of the copy paper when the counting value stored in the first counter becomes equal to the preset number of the copy paper; counting the discharged copy paper by means of a second counter; and detecting paper jamming, and supplying the counting value of the second counter to the counting value of the first counter. It is not necessary to preset the number of required copies again after a jammed paper is expelled. Since the copying operation is continuously restarted, the preset number of copies are precisely reproduced.

12 Claims, 2 Drawing Figures

COPY PAPER COUNTING METHOD AND DEVICE FOR COPYING APPARATUS

BACKGROUND OF THE INVENTION

1. Field of the Invention

The present invention relates to a method and a device of counting copy papers to be used for a copying apparatus, and more particularly to preset operation for successively reproducing of a plurality of copies corresponding to an original document.

2. Description of the Prior Art

In a conventional typical copying apparatus, the copy papers fed therein during in a copying step are counted. When the number of copy papers fed therein becomes equal to a preset number of copies, the feed of copy papers is terminated and thus, the desired number of copies are reproduced. Therefore, when paper jamming occurs on a copy paper transport path before the copying step is completed, the copying step is interrupted. On this occasion, a jammed paper and a transported paper have been already counted even though they are expelled out of the copying apparatus. Then, if the copying step is restarted in the above-mentioned state, the number of copies corresponding to the jammed paper which was expelled are deducted from the preset number of copies to be reproduced. Accordingly, when the paper jamming is released and the copying step is restarted, it is necessary to reset the number of copies in the prior art systems.

SUMMARY OF THE INVENTION

In accordance with the present invention, there is provided an improved method of counting copy papers used for a copying apparatus which is capable of successively reproducing a plurality of copies corresponding to an original document. The improved method comprises the steps of (a) detecting a copy paper being fed therein to perform a copying operation, and counting the copy paper by means of a first counter, (b) terminating the feed of the copy paper when the counting value stored in the first counter becomes equal to the preset number of the copy paper, and accomplishing a continuous copying operation, (c) detecting a copy paper being discharged after completion of the copy operation, and counting the discharged copy paper by means of a second counter, and (d) detecting paper jamming, and supplying the counting value of the second counter to the counting value of the first counter. There is further provided an improved copy paper counting device used for a copying apparatus capable of reproducing a plurality of copies corresponding to an original document successively. The improved copy paper counting device comprises (e) a memory means for presetting a number of a copy paper and for storing the preset number, (f) a first counting means for counting the copy paper being fed, the feed of the copy paper being terminated when the counting value of the first counting means becomes equal to the preset number, (g) a second counting means for counting the discharged copy paper, (h) a means for detecting paper jamming, (i) a means in response to the output from the paper jamming detecting means for causing the first counting means to store the counting value of the second counting means. In brief, the first counter counts a copy paper to be fed. When the counting value of the first counter becomes equal to the preset number of copies, the feeding operation is terminated and the continuous copying operation is accomplished. Then, the second counter detects copy papers which are reproduced and discharged, and counts them. When paper jamming occurs, the value of the second counter is supplied to the first counter, such that the value of the first counter thereby becomes the number of copy papers discharged even though paper jamming has occurred. Therefore, it is not necessary to again preset the number of copies required after a jammed paper is expelled. Since the copying operation is continuously restarted, the preset number of copies are precisely reproduced.

It is an object of this invention to provide an improved method and device of counting copy papers for solving the foregoing shortcomings.

It is another object of this invention to provide a method and device for reproducing the desired number of copies continuously even though the copying step is restarted without resetting the number of copies required after the paper jamming is released.

According to one aspect of the invention, the method comprises the steps of: in the step of counting the copy paper by means of the first counter, the first counter being a subtracting counter, subtracting one from the preset number for each feed of the copy paper; and in the step of counting the discharged copy paper by means of the second counter, the second counter being a subtracting counter, subtracting one from the preset number for each discharge of the copy paper.

According to another aspect of the invention, the method comprises the steps of: in the step of counting the copy paper by means of the first counter, the first counter being an adding counter, adding one for each feed of the copy paper; in the step of counting the discharged copy paper by means of the second counter, the second counter being an adding counter, adding one for each discharge of the copy paper; and comparing the counting value of the first counter with the preset number, and terminating the feed of the copy paper when the counting value of the first counter is equal to the preset number.

In the preferred embodiment, the method comprises a step of displaying the counting value of the first counter.

In accordance with one preferred embodiment, the first counting means comprises a subtracting counter for subtracting one from the preset number for each feed of the copy paper, and the second counting means comprises a subtracting counter for subtracting one from the preset number for each discharge of the copy paper.

In another preferred embodiment, the first counting means comprises an adding counter for adding one for each feed of the copy paper, the second counting means comprises an adding counter for adding one for each discharge of the copy paper, and a store causing means comprises comparing means for comparing the counting value of the first counter with the preset number and for supplying output for terminating the feed when the counting value of the first counter is equal to the preset number.

A copy paper counting device used for a copying apparatus further comprises means for displaying the counting value of the first counting means.

The second counting means maintains the counting value of the discharged copy paper after the store causing means causes the first counting means to store the counting value of the second counting means.

BRIEF DESCRIPTION OF THE DRAWINGS

A detailed description of the invention will be made with reference to the accompanying drawings herein like numerals designate corresponding parts in the figures.

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention is best defined by the appended claims.

Figure 1:
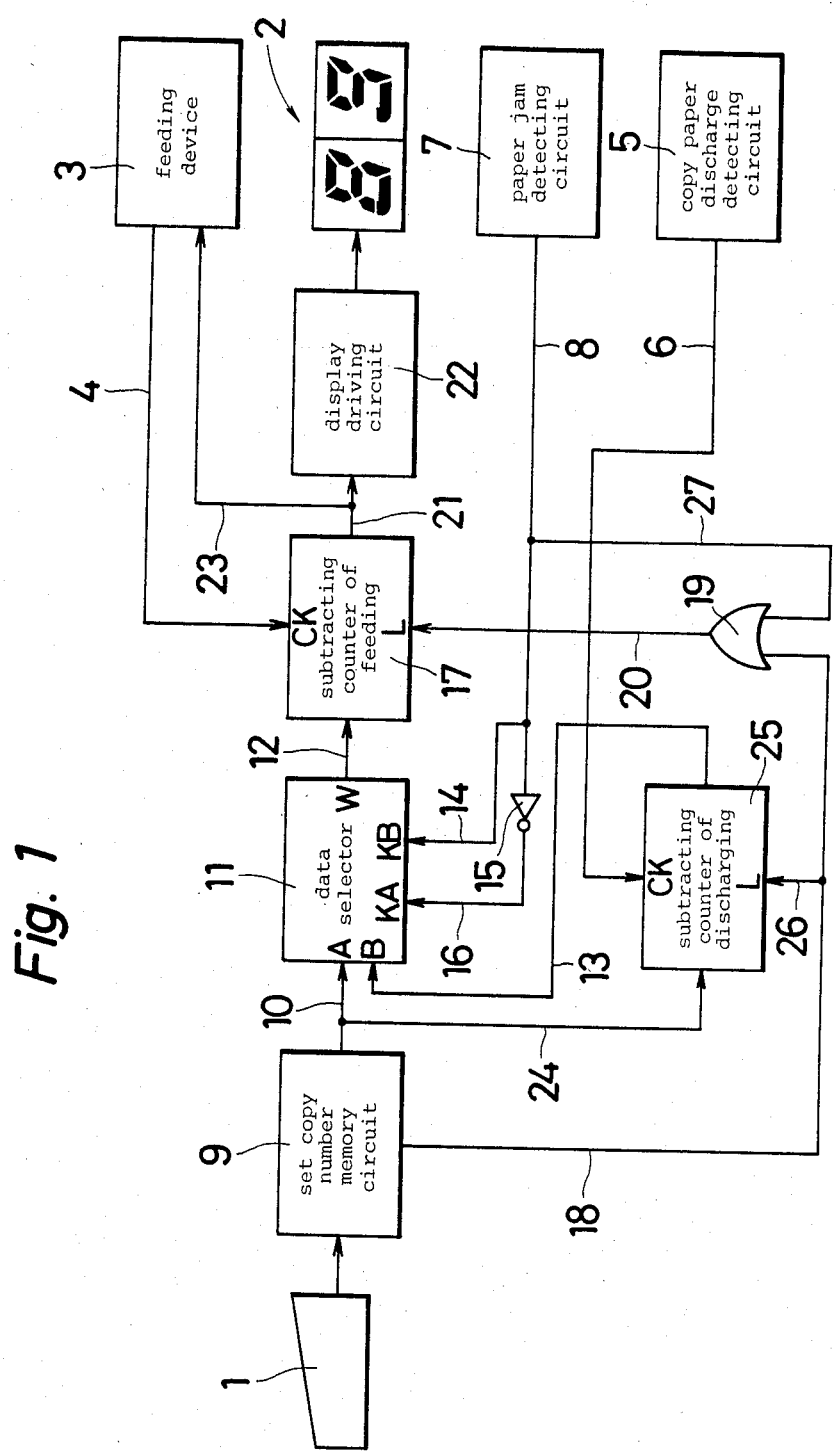
FIG. 1 is a block diagram of a preferred embodiment of the invention.

FIG. 1 is a block diagram of an embodiment of the invention. When multiple copies are reproduced from an original document, the number of required copies is selected by pressing a copy setting means (for example a ten key keyboard 1) after closing a power switch (not shown) of a copying apparatus. Accordingly, the selected number of copies is displayed at a display station 2 which comprises display elements having first and second digits. In the feeding operation, a feeding device 3 provides a single pulse on line 4 whenever each individual copy paper is fed. When the feeding device 3 receives a low level signal from line 23, the feeding operation is finished, and the required multiple copies have been made. In a copy paper discharge detecting circuit 5, a micro switch (not shown) is disposed on a copy paper transport path for guiding a copy paper after completion of the copying step. Whenever the micro switch detects a copy paper being discharged, the copy paper discharge detecting circuit 5 provides a single pulse on line 6. A paper jam detecting circuit 7 is provided with two micro switches at a distance in the transport direction of the copy paper transport direction. In the case where the micro switch disposed upstream detects the copy paper and then the micro switch disposed downstream does not detect the copy paper after a predetermined time period elapses, or in the case where the micro switch disposed in the down stream continues to detect the copy paper over a predetermined time period, the paper jam detecting circuit 7 recognizes that a paper jamming has occured and provides a high level signal on line 8. Since the paper jam detecting circuit 7 is provided with a reset button (not shown), a low level signal is supplied from the paper jam detecting circuit 7 to line 8 by pressing the reset button after a jammed paper has been expelled from the copying apparatus.

By pressing the keys of the keyboard 1, the information indicating the desired number of copies supplied by the keyboard 1 is supplied to a set copy number memory circuit 9 and is also supplied from the set copy number memory circuit 9 via line 10 to an input terminal A of a data selector 11. The data selector 11 serves to close terminals A and W when a high level signal is supplied to a terminal KA and a low level signal is supplied to a terminal KB. The data selector 11 also serves to close terminals B and W when a low level signal is supplied to the terminal KA and a high level signal is supplied to the terminal KB. Since the output signal from the paper jam detecting circuit 7 to line 8 is a low level upon pressing the key of the keyboard 1, a low level signal is supplied via lines 8 and 14 to the terminal KB and a high level signal from line 16 is supplied from line 8 via a NOT gate 15 to the terminal KA. Accordingly, line 10 is connected with line 12 via the data selector 11 and the information from the set copy number memory circuit 9 is applied via the data selector 11 to a subtracting counter of feeding 17. The subtracting counter of feeding 17 serves to store an input value from line 12 when an input signal to a load terminal L is at a high level. The set copy number memory circuit 9 provides a high level signal on line 18 by pressing the keys of the keyboard 1, and the high level signal is supplied from line 20 via line 18 and an OR gate 19 to the load terminal L of the subtracting counter of feeding 17. Accordingly, the preset number of copies is stored in the subtracting counter of feeding 17 by pressing the keys of the keyboard 1. The information stored in the subtracting counter of feeding 17 is displayed as the preset number of copies at the display station 2 via line 21 and a display driving circuit 22.

The information supplied from the set copy number memory circuit 9 is supplied from line 10 via line 24 to a subtracting counter of discharging 25. The subtracting counter of discharging 25 serves to store the information from line 24 when the load terminal L receives a high level signal. Since the high level signal is supplied from the set copy number memory circuit 9 via lines 18 and 26 to the load terminal L of the subtracting counter of discharging 25, the information from the set copy number memory circuit 9 is stored in the subtracting counter of discharging 25.

When a multiple copying operation is commenced by pressing a print button (not shown), the feeding device 3 is enabled to feed copy papers and provides a single pulse on line 4 in for every feeding operation of copy paper. Whenever this single pulse is supplied to a terminal CK of the subtracting counter of feeding 17, the number stored in the subtracting counter of feeding 17 is reduced by one. Correspondingly, the value displayed at the display station 2 is also reduced by one via the display driving circuit 22. At each time when a copy paper fed out of the copying apparatus is detected after completion of a copying operation, the discharge detecting circuit 5 provides a single pulse on line 6. Whenever the terminal CK of the subtracting counter of discharging 25 receives this pulse, the number stored in the subtracting counter of discharging 25 is reduced by one. When the number of the subtracting counter of feeding 17 becomes equal to the preset number of copies, the low level signal is applied from the subtracting counter of feeding 17 via lines 21 and 23 to the feeding device 3. Correspondingly, the feeding device 3 stops feeding copy papers and the preset number of copies are reproduced.

Assume that the paper jamming occurs on the transport path during a multiple copying operation as described before. Then, the paper jam detecting circuit 7 provides a high level signal on line 8. Therefore, the high level signal is supplied from line 14 to the terminal KB of the data selector 11 and the low level signal is supplied via a NOT gate 15 and line 16 to the terminal KA. Since the terminals B and W of the data selector 11 are closed, line 13 is connected with line 12 via the data selector 11. Correspondingly, the information stored in the subtracting counter of discharging 25 is supplied via line 13, the data selector 11 and line 12 to the subtracting counter of feeding 17. When the paper jamming has occured, a high level signal is supplied via line 27 shunted from line 8, the OR gate 19 and line 20 to the load terminal L of the subtracting counter of feeding 17. Therefore, the information stored in the subtracting counter of discharging 25 is transferred to and stored in the subtracting counter of feeding 17. Correspondingly, the information stored in the substracting counter of feeding 17 is displayed at the display station 2 via the display driving circuit 22. The value displayed at the display station 2 changes from the number of copy papers fed before the paper jamming to that of the number of copy papers discharged before the paper jamming. In brief, when the paper jamming occurs, the number of copy papers discharged after completion of the copying operation is subtracted from the preset number of copies and the resultant value is stored in the subtracting counter of feeding 17 and is displayed at the display station 2. If two copy papers are sequentially jammed in the transporting direction of the copy paper transport path, the value of the subtracting counter of feeding 17 becomes equal to the value of the number of the occasion of the paper jamming plus 2. Similarly, the value of the number of the occasion of the paper jamming plus 2 is displayed at the display station 2.

To release the paper jamming, take a jammed paper out of the copying apparatus; furthermore, in the case where there is another copy paper on the copy paper transport path, take it together with the jammed paper. Then, the reset button (not shown) of the paper jam detecting circuit 7 is pressed. Thus, the paper jam detecting circuit 7 is reset and an output signal from the paper jam detecting circuit 7 to line 8 becomes a low level. When an output signal supplied from line 8 changes from high level to low level, the data selector 11 causes the terminals A and thereby causes W to close and line 10 to be connected to line 12. On the contrary, since an output signal supplied from the set copy number memory circuit 9 to line 18 is at a low level, the information of the set copy number memory circuit 9 is never stored in the subtracting counter of feeding 17. A print button is also pressed after the reset button is pressed, and the preceding preset number of copies set by the keyboard 1 is reproduced without setting the number of copies again.

Though the stored information of the subtracting counter of discharging 25 is transferred to the subtracting counter of feeding 17 as noted above when the paper jamming occurs, the stored information of the subtracting counter of discharging 25 is not erased yet and remains to be stored. Accordingly, even though the paper jamming occurs several times, it is not necessary to again set the number of copies.

Figure 2:
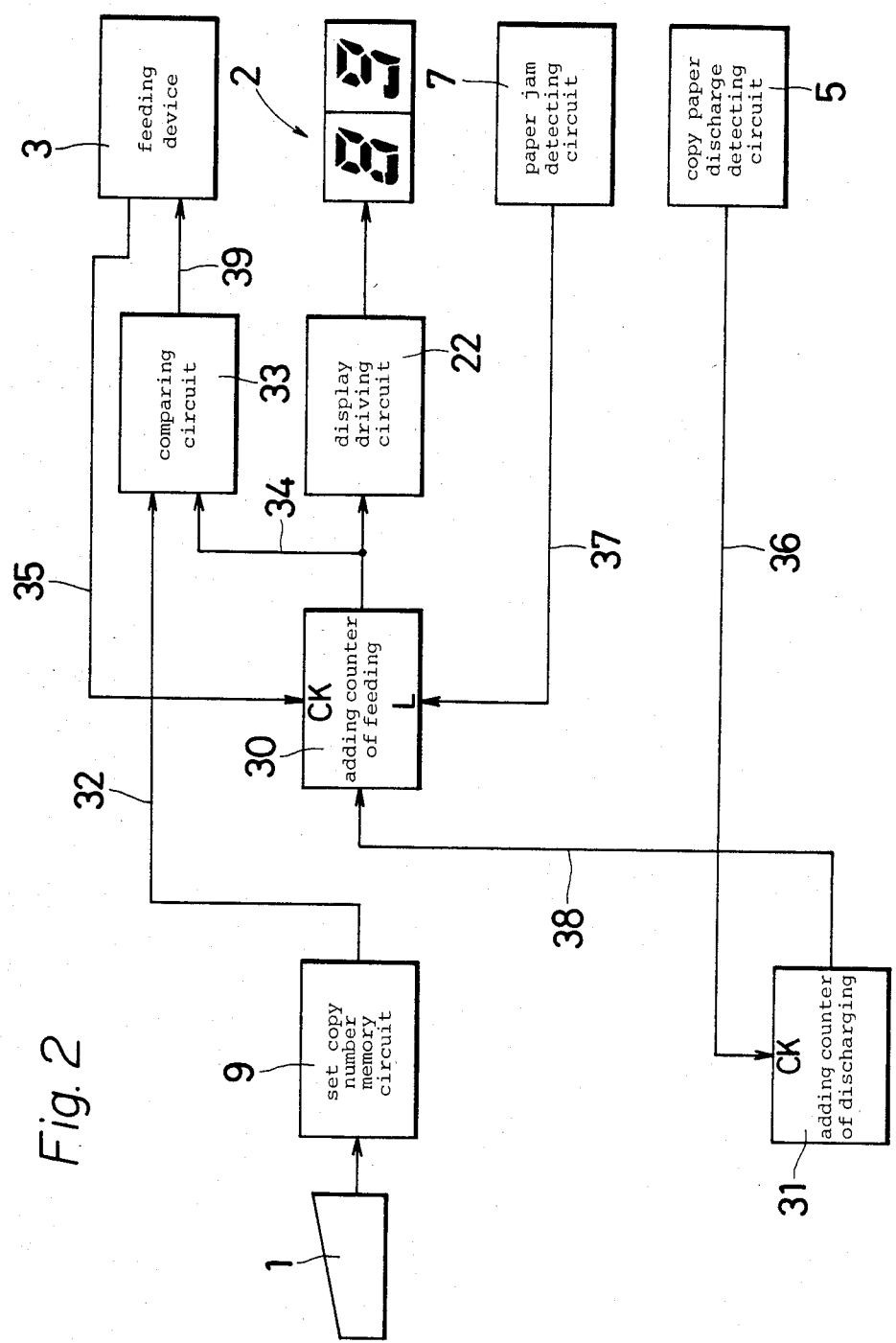
FIG. 2 is a block diagram of another preferred embodiment of the invention.

FIG. 2 is a block diagram of another embodiment of the invention. The same reference numerals designate the corresponding portions shown in FIG. 1. In this embodiment, adding counters of feeding 30 and of discharging 31 are utilized in order to count the number of copies in place of the subtracting counters of feeding 17 and of discharging 25 of FIG. 1. The information supplied from the keyboard 1 to the set copy number memory circuit 9 is supplied via line 32 to one input terminal of a comparing circuit 33. A single pulse corresponding to every feeding of a copy paper is applied via line 35 to a terminal CK of the adding counter of feeding 30. Correspondingly, the adding counter of feeding 30 increases its stored value one by one, starting from a stored value of zero, when the load terminal L receives a low level signal. The value of the adding counter of feeding 30 is displayed at the display station 2 via the display driving circuit 22. Therefore, the value displayed at the display station 2 has one added thereto for every feeding a copy paper. The value of the adding counter of feeding 30 is applied via line 34 to the other input terminal of the comparing circuit 33. A single pulse is applied via line 36 to the terminal CK of the adding counter of discharging 31 for each time when the discharge detecting circuit 5 detects a discharge of a copy paper, and the value stored in the adding counter of feeding 31 has one added thereto, starting from a stored value of zero.

In the comparing circuit 33, when the input value from line 32 becomes equal to the input value from line 34, i.e. when the number of copies set by the keyboard 1 equals the value of the adding counter of feeding 30, a low level signal is supplied from the comparing circuit 33 via line 39 to the feeding device 3. Accordingly, the feeding device 3 stops feeding copy papers and the preset number of copies are reproduced.

Assume that the paper jamming occurs during the copying operation as above-mentioned. Then, a high level signal is applied from the paper jam detecting circuit 7 via line 37 to the load terminal L of the adding counter of feeding 30. Since the value of the adding counter of discharging 31 is applied via line 38 to the adding counter of feeding 30, the value of the adding counter of discharging 31 is transferred to and is stored in the adding counter of feeding 30 when the load terminal L receives a high level signal. At the same time, the value from the adding counter of discharging 31 is displayed at the display station 2 via the display driving circuit 22. When the paper jamming occurs, the value of the adding counter of discharging 31 is stored in the adding counter of feeding 30. Therefore, it is not necessary to again set the number of copies after a jammed paper is expelled and the preset number of copies are successively reproduced.

What is claimed is:

1. A method of counting copy papers to be used for a copying apparatus capable of successively reproducing a plurality of copies corresponding to an original document, comprising the steps of:
   detecting a copy paper being fed to perform a copying operation, and counting the copy paper by means of a first counter;
   terminating the feed of the copy paper when the counting value stored in the first counter becomes equal to a preset number;
   detecting a copy paper being discharged after completion of a copying operation, and counting the discharged copy paper by means of a second counter; and
   detecting paper jamming, and resetting the counting value of the first counter so as to be equal to the counting value of the second counter in response thereto.

2. A method of counting copy papers to be used for a copying apparatus according to claim 1, further comprising the steps of:
   in the step of counting the copy paper by means of the first counter, the first counter being a subtracting counter, subtracting one from the preset number for each feed of the copy paper; and
   in the step of counting the discharged copy paper by means of the second counter, the second counter being a subtracting counter, subtracting one from the preset number for each discharge of the copy paper.

3. A method of counting copy papers to be used for a copying apparatus according to claim 1, further comprising the steps of:
in the step of counting the copy paper by means of the first counter, the first counter being an adding counter, adding one for each feed of the copy paper; and
in the step of counting the discharged copy paper by means of the second counter, the second counter being an adding counter adding one for each discharge of the copy paper.

4. A method of counting copy papers to be used for a copying apparatus according to claims 1, 2, or 3, further comprising the step of:
displaying the counting value of the first counter.

5. A copy paper counting device to be used for a copying apparatus capable of successively reproducing a plurality of copies corresponding to an original document, comprising:
a memory means for presetting a required number of copy papers and for storing the preset number;
a first counting means for counting the copy paper being fed, the feed of the copy paper being terminated when the counting value of the first counting means becomes equal to the preset number;
a second counting means for counting the discharged copy paper;
a means for detecting paper jamming and providing an output in response thereto;
a means for causing the first counting means to store the counting value of the second counting means in response to the output from the paper jamming detecting means.

6. A copy paper counting device to be used for a copying apparatus according to claim 5, wherein;
the first counting means comprises a subtracting counter for subtracting one from the preset number for each feed of the copy paper,
the second counting means comprises a subtracting counter for subtracting one from the preset number for each discharge of the copy paper.

7. A copy paper counting device to be used for a copying apparatus according to claim 5, wherein;
the first counting means comprises an adding counter for adding one for each feed of the copy paper,
the second counting means comprises an adding counter for adding one for each discharge of the copy paper,
the store causing means comprises a comparing means for comparing the counting value of the first counter with the preset number and for supplying an output for terminating the feed of the copy paper when the counting value of the first counter is equal to the preset number.

8. A copy paper counting device to be used for a copying apparatus according to claims 5, 6 or 7, further comprising;
means for displaying the counting value of the first counting means.

9. A copy paper counting device to be used for a copying apparatus according to claims 5, 6, or 7, wherein the second counting means maintains the counting value of the discharged copy paper after the store causing means causes the first counting means to store the counting value of the second counting means.

10. A copy paper cutting device to be used for a copying apparatus according to claim 8, wherein the second counting means maintains the counting value of the discharged copy paper after the store causing means causes the first counting means to store the counting value of the second counting means.

11. A copy paper counting device to be used for a copying apparatus capable of successively reproducing a plurality of copies corresponding to an original document, comprising,
a keyboard,
a set copy number memory circuit for presetting a number of required copy papers in response to a signal from the keyboard, and for storing the preset number,
a copy paper feeding device,
a first subtracting counter for subtracting one from the preset number for each feed of the copy paper in response to an output signal from the copy paper feeding device, the feed of the copy paper being terminated when the counting value of the first subtracting counter becomes equal to the preset number,
a copy paper discharge detecting circuit,
a second subtracting counter for subtracting one from the preset number for each discharge of the copy paper in response to the output signal from the copy paper discharge detecting circuit, and for holding the counting value after providing the counting value to the first subtracting counter,
a jam detecting circuit which comprises first and second switches spaced along a copy paper transport passage, and which detects paper jamming when either the first switch disposed upstream detects a sheet of copy paper and then the second switch disposed downstream does not detect the copy paper after a predetermined time period has elapsed, or when the second switch continues to detect the presence of the copy paper over a predetermined time period,
a data selector for transmitting the counting value stored in the set copy number memory circuit to the first subtracting counter in the process of a copying operation, and for transmitting the counting value stored in the second subtracting counter to the first subtracting counter in response to the jam detecting circuit when a copy paper is jammed,
a reset button for resetting the jam detecting circuit after a jammed paper has been removed from the copying apparatus, and
a display driving means for displaying the counting value stored in the first subtracting counter in response to the output signal from the first subtracting counter.

12. A copy paper counting device to be used for a copying apparatus capable of successively reproducing a plurality of copies corresponding to an original document, comprising,
a keyboard,
a set copy number memory circuit for presetting a number of required copy papers in response to a signal from the keyboard, and for storing the preset number,
a copy paper feeding device,
a first adding counter for adding one for each feed of the copy paper in response to an output signal from the copy paper feeding device, a comparing circuit for terminating feed of the copy paper in response to the output signal from the first adding counter and the output signal from the set copy number memory circuit when the counting value of the first adding counter becomes equal to the counting value of the set copy number memory circuit, a jam detecting circuit which comprises first and second switches spaced along a copy paper transport passage, for detecting paper jamming when either the first switch disposed upstream detects a sheet of copy paper and then the second switch disposed downstream does not detect the copy paper after a predetermined time period has elapsed, or when the second switch continues to detect the presence of the copy paper over a predetermined time period, a copy paper discharge detecting circuit, a second adding counter for adding one for each discharge of the copy paper in response to the output signal from the copy paper discharge detecting circuit, and for providing the stored counting value to the first adding counter in response to the output signal from the jam detecting circuit and to hold the counting value after providing the counting value to the first adding counter, a reset button for resetting the jam detecting circuit after a jammed paper is removed from the copying apparatus, and a display driving means for displaying the counting value stored in the first adding counter in response to the output signal from the first adding counter.

* * * * *